United States Patent [19]
Barnes et al.

[11] Patent Number: 5,842,713
[45] Date of Patent: Dec. 1, 1998

[54] COLLAPSIBLE STROLLER

[75] Inventors: Deborah A. Barnes, Boynton Beach; Carolyn R. Lane, West Palm Beach; Freddy T. Lee, Boynton Beach, all of Fla.

[73] Assignee: Ambar Concepts, Inc., Boynton Beach, Fla.

[21] Appl. No.: 941,248

[22] Filed: Sep. 30, 1997

[51] Int. Cl.⁶ .................................................. B62B 3/02
[52] U.S. Cl. ...................... 280/642; 280/47.38; 280/642; 280/644; 280/647
[58] Field of Search ................ 280/639, 38, 39, 280/641, 642, 644, 647, 651, 657, 658, 47.38, 62

[56] References Cited

U.S. PATENT DOCUMENTS

| | | | |
|---|---|---|---|
| 4,902,027 | 2/1990 | Skelly | 280/33.998 |
| 5,299,825 | 4/1994 | Smith | 280/644 |
| 5,344,171 | 9/1994 | Garforth-Bles | 280/415.1 |
| 5,356,171 | 10/1994 | Schmidlin | 280/650 |
| 5,468,009 | 11/1995 | Eyman | 280/650 |
| 5,522,614 | 6/1996 | Eyman | 280/642 |
| 5,590,896 | 1/1997 | Eichhorn | 280/642 |
| 5,611,560 | 3/1997 | Thimmig | 280/642 |
| 5,669,624 | 9/1997 | Eichhorn | 280/642 |
| 5,695,212 | 12/1997 | Hinkston | 280/642 |

*Primary Examiner*—D. Glenn Dayoan
*Assistant Examiner*—Clovia Hamilton
*Attorney, Agent, or Firm*—Alvin S. Blum

[57] ABSTRACT

A stroller having wide wheels for use on soft sand. A forward wheel is mounted midline supported by a forward frame portion that is hingedly connected to a rear frame portion on which are mounted spaced apart rear wheels so that another stroller's forward wheel will nest therebetween. The hinge connecting the frame portions enables folding them to be parallel to one another and unfolding to lie in a common plane but prevents rotation beyond that plane. A vertical strut hinged to the rear of the rear portion is attached to a diagonal strut hinged to the rear of the forward frame portion to secure the use position, and a handle is hinged to the diagonal strut. The various components fold to lie parallel to one another in a compact storage position. A fabric or mesh seat is mounted on the diagonal strut and a footrest on the forward frame portion.

8 Claims, 5 Drawing Sheets

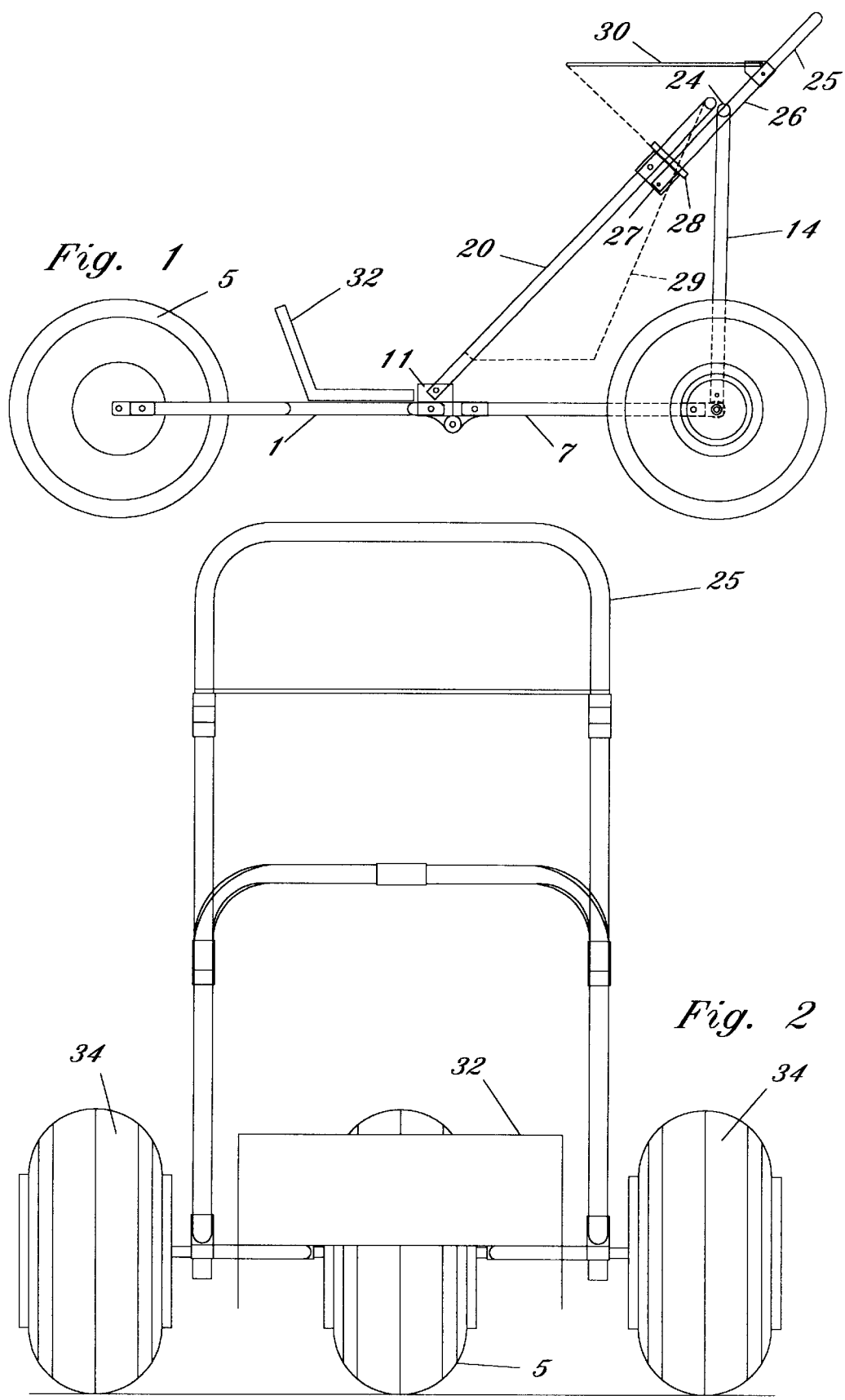

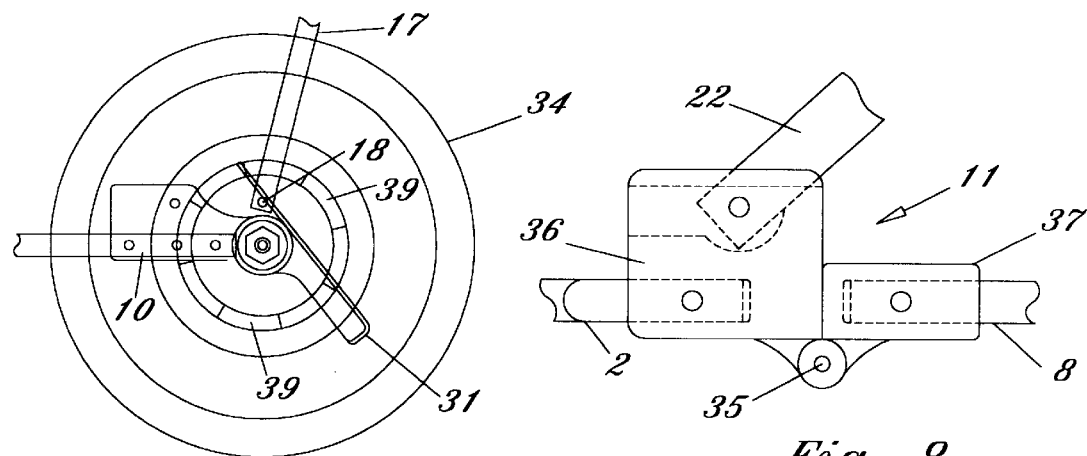
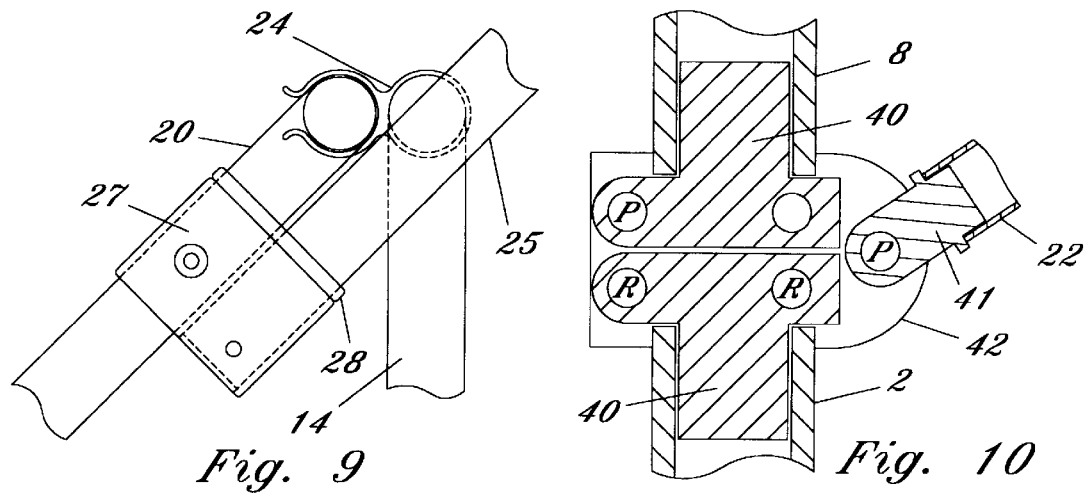
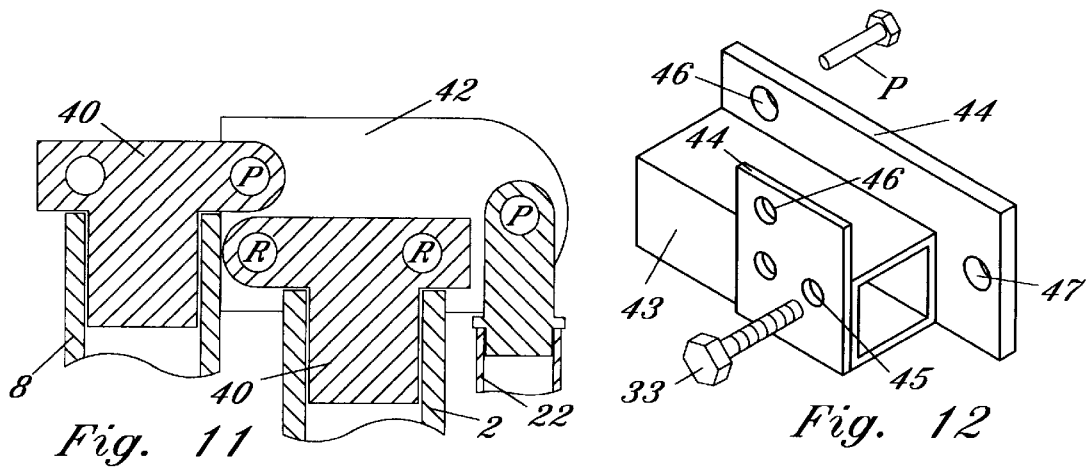

COLLAPSIBLE STROLLER

BACKGROUND OF THE INVENTION

This invention relates to strollers, and more particularly to all terrain nestable strollers that are collapsible into a compact configuration.

Although parents of young children will generally carry along an ordinary stroller on brief trips, these strollers have wheels that work effectively only on relatively hard, smooth surfaces. They are ineffective on beach sand or on a hiking trail. If a vacation destination is to be reached by plane, it is easier to rent a stroller on arrival. A special all terrain stroller that will be seldom used is also more suitable for rental than purchase. A concessionaire at a beach, for example, will require a stroller with large surface bearing area tires that will roll easily over soft sand. If they nest together like shopping carts they can be more effectively controlled in a minimum of space. Because the beach season is short, the cost of storage in the off season is also important. It is also useful to have strollers that can be readily folded into a compact configuration for overnight transport and secure storage in high crime areas.

SUMMARY OF THE INVENTION

It is accordingly an object of the invention to provide strollers that, when unfolded, are nestable, roll easily on soft sand, and that provide safe and comfortable support for the child. It is another object that they fold up into a compact configuration for transport and storage.

These and other objects, advantages and features of the invention will become more apparent when the detailed description is studied in conjunction with the drawings, in which like reference characters designate like elements in the various drawing figures.

BRIEF DESCRIPTION OF THE DRAWINGS

FIG. 1 is a side elevation view of the stroller in use position.

FIG. 2 is a front elevation view of the stroller in use position, without fabric seat.

FIG. 7 is a detail of the rear wheel and brake portion of FIG. 1.

FIG. 8 is a detail of the hinge connecting frame portions of FIG. 1.

FIG. 9 is a detail of the junction of diagonal strut and vertical strut of FIG. 1.

FIG. 10 is a sectional detail of another hinge embodiment substituting for the hinge of FIG. 8 in the use position.

FIG. 11 is a sectional detail of the hinge of FIG. 10 in storage position.

FIG. 12 is a perspective view, partially broken away of another rear axle support.

DETAILED DESCRIPTION OF PREFERRED EMBODIMENTS

Figure 3:
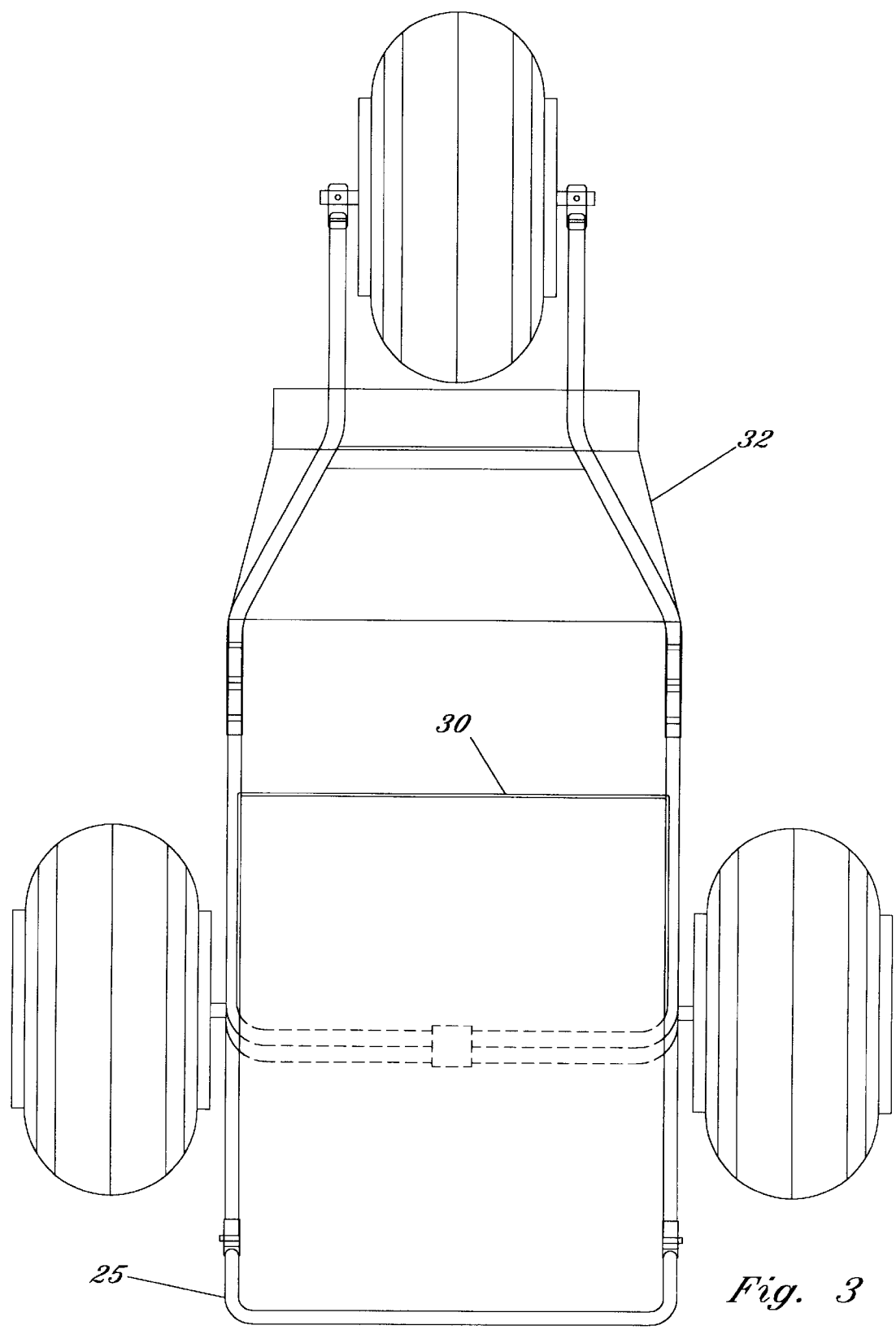
FIG. 3 is a top view of the stroller in use position, without fabric seat.
Figure 4:
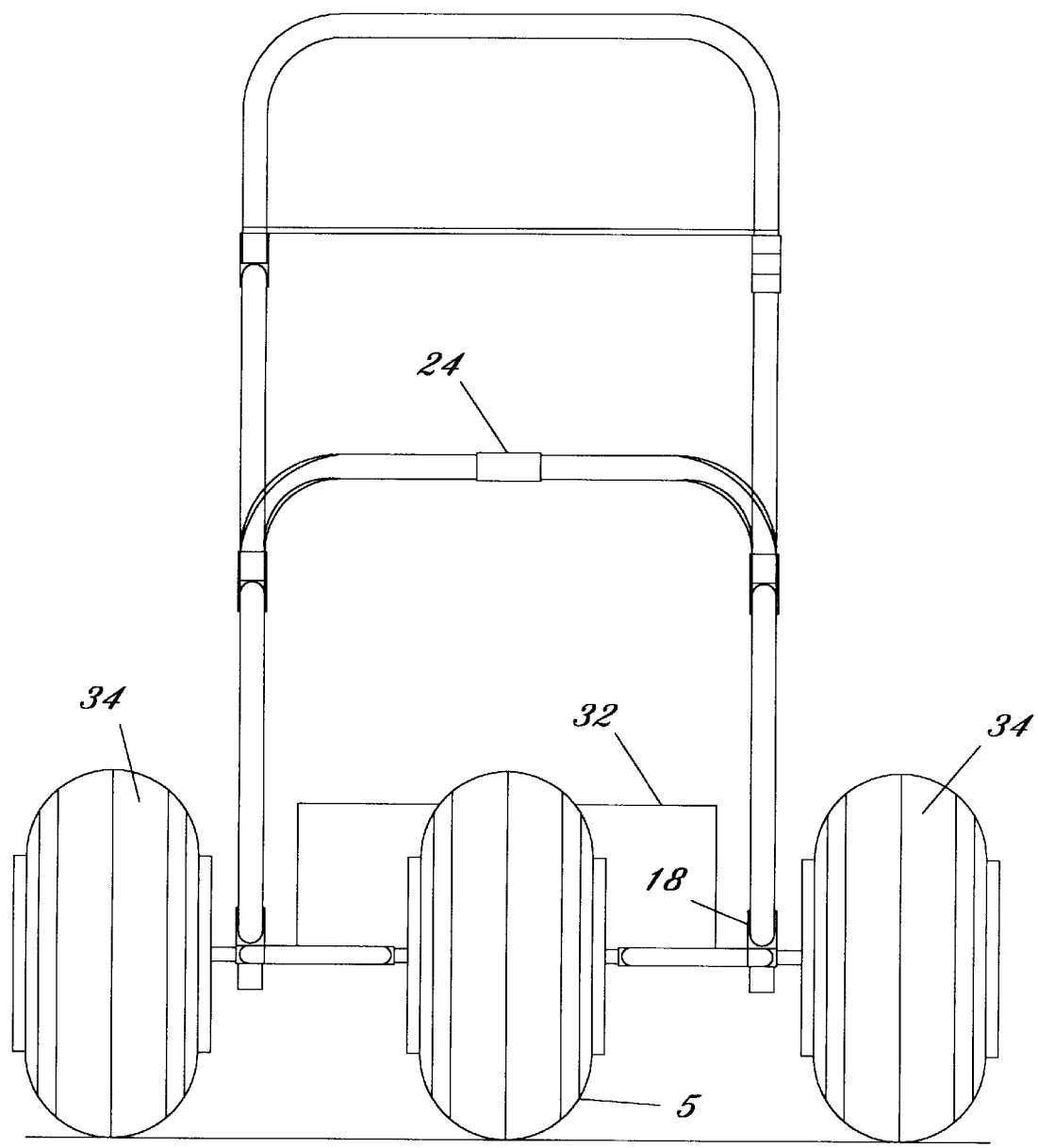
FIG. 4 is a rear elevation view of the stroller in use position, without fabric seat.
Figure 5:
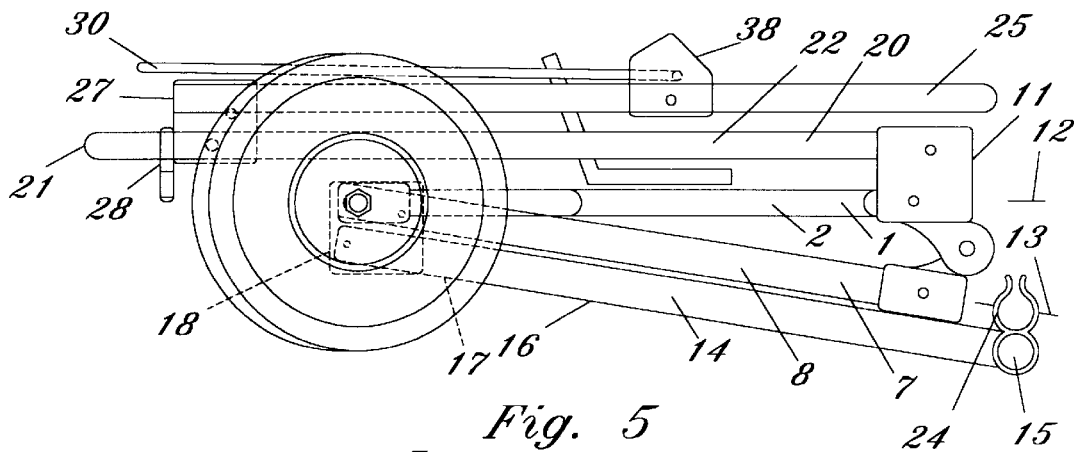
FIG. 5 is a side elevation view of the stroller in storage position, without fabric seat.
Figure 13:
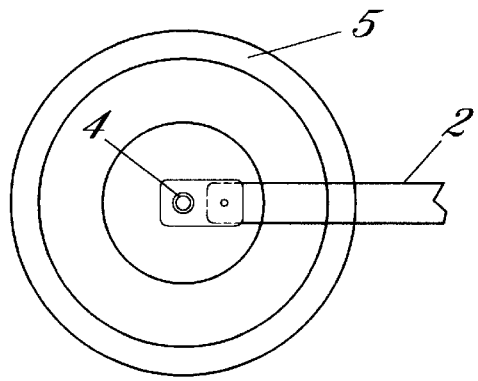
FIG. 13 is a detail of the front wheel portion of FIG. 1.
Figure 6:
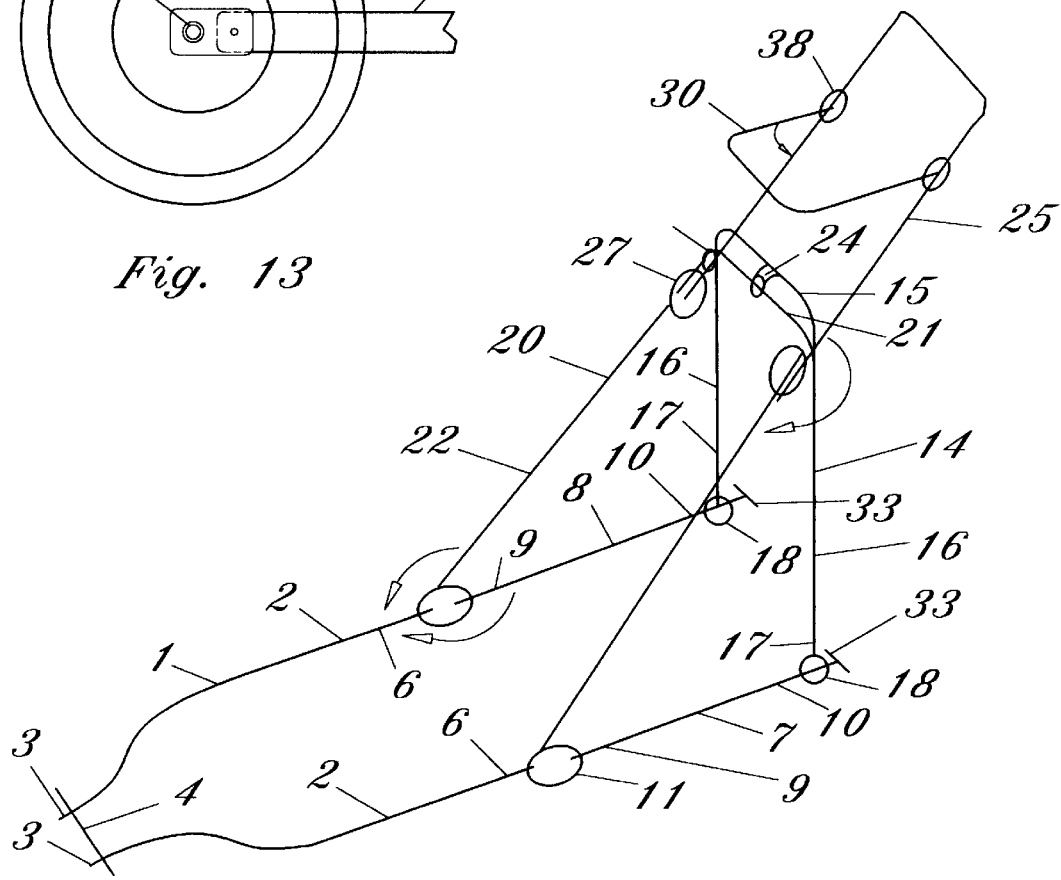
FIG. 6 is a perspective diagrammatic representation of the frame of the stroller in use position.

Referring now first to FIGS. 1–6, the collapsible and nestable stroller of the invention has a use position in which the forward wheel 5 is centrally located on a horizontal base frame comprised of a forward frame portion 1 supporting wheel 5 on axle 4 and rear frame portion 7 supporting wheels 34 on axles 33 spaced sufficiently apart that a forward wheel of another such stroller will fit between wheels 34 to enable multiple strollers to be nested together when not in use to conserve space such as at a beach rental concession. The wheels may have wide tires with large surface bearing areas sufficient to support the stroller on soft sand. More than one wheel may be mounted on an axle as is well known in the art. In the use position the forward and rear frame portions lie substantially in a common horizontal plane.

The forward frame portion 1 includes two lateral legs 2 spaced close together at forward ends 3 where they support axle 4 and spaced farther apart at rear ends 6.

The rear frame portion 7 includes two lateral legs 8 having front ends 9 and back ends 10. A rear axle 33 mounted on each back end rotatably supports one or more wheels 34.

A hinge 11 connects each front end 9 of a leg 8 of the rear frame portion 7 to a rear end 6 of a leg 2 of the forward frame portion 1 for swinging movement between a use position when the two frame members are in a common plane to a storage position in which the legs of the forward frame portion lie in a plane 12 that is parallel to, and superposed on, the plane 13 in which lie the legs 8 of the rear frame portion. The hinge 11 is so constructed that it limits rotation of the frame portions beyond the coplanar use position and limits angle of strut 20 with protuberence 50.

As best seen in FIG. 8, the legs 2 and 8 pivot about pivot 35. They are mounted in hinge members 36, 37 which butt against each other to define the use position and prevent further rotation. The two frame portions then act as a stiff straight member between the wheels to support a passenger in the stroller.

A U shaped vertical strut 14 has an intermediate portion 15 and parallel legs 16. The end 17 of each leg 16 is pivotally attached to the end 10 by connector 18 for swinging movement between the vertical use position and the storage position in which it lies superposed on the rear frame portion and parallel thereto.

A U shaped diagonal strut 20 has intermediate portion 21 and legs 22 with ends that are pivotally attached to the hinges 11 for swinging movement between a use position in which the intermediate portion 21 is removably attached to the intermediate portion 15 of the vertical strut by attachment 24 to form two rigid triangles and a storage position with the strut 20 lying superposed and parallel to rear frame portion 7. Pins 48 on intermediate portion 21 of strut 20 are received in holes (not shown) in intermediate portion 15 of vertical strut 14 to further enhance rigidity of the frame.

A U shaped handle assembly 25 has legs 26 that are hingedly connected by hinges 27 to the diagonal strut for swinging movement between a use position in which the handle assembly extends diagonally upward from the diagonal strut at the same angle and a storage position substantially parallel to and superposed on the diagonal strut. A snap latch 28 removably locks the handle assembly to the diagonal strut in the use position.

A fabric or mesh seat assembly 29 is mounted on the diagonal strut 20. A footrest 32 is mounted on the forward frame assembly 1. A canopy 30 is hingedly connected to the handle assembly by hinges 38 for swingable movement between a horizontal use position and a storage position superposed on the handle assembly.

When the stroller is in the use position it provides a flat package of quite small dimension so that it may be readily transported and stored.

As shown in FIG. 7, a brake pedal 31 may be provided to engage lugs 39 projecting from rear wheel 34 when pivoted in a first direction to stop the stroller.

FIGS. 10 and 11 show an alternative hinge assembly for joining the frame portions. Affixed within the tubular members 2 and 8 are rigid inserts 40 that are each provided with two apertures. Affixed within tubular members 22 is a rigid insert 41 with one aperture. Two parallel plates 42, provided with 4 apertures, are affixed on opposed sides of the three inserts by rivets R. Pivot pins P permit rotation of member 22 and limited rotation of member 8 between use and storage positions. Pin 49 limits rotation at the use position.

FIG. 12 shows an alternative rear axle support assembly for mounting axle 33 on a rectangular tubular rear frame portion 43. Two parallel plates 44 each having four apertures are affixed to opposed faces of the rectangular tube by rivet R. Apertures 45 receive rear axle 33. Apertures 46 receive a pivot pin P to hingedly mount the vertical strut. Apertures 47 receive a pivot pin for mounting the brake pedal (not shown).

The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A collapsible and nestable stroller comprising:
   A) a forward frame portion including two lateral legs having forward and rear ends, the legs being spaced close together at the forward ends and supporting therebetween a forward axle and at least one wheel rotatably mounted on the forward axle, the legs being spaced farther apart at the rear ends than the front ends;
   B) a rear frame portion including two lateral legs having front and back ends, each back end supporting thereon a rear axle and at least one wheel rotatably mounted on the rear axle;
   C) hinge means for hingedly connecting each front end to one of the rear ends for swinging movement between a use position in which the lateral legs of the forward and rear frame portions lie substantially in a common horizontal plane and a storage position in which the legs of the forward and rear frame portions lie in substantially parallel planes superposed on one another, the hinge means limiting the motion of the legs beyond the common plane in the use position;
   D) a U shaped vertical strut having an intermediate portion and two legs with ends that are pivotally attached to the back ends of the rear frame assembly for swinging movement between a use position in which the strut extends substantially vertical and a storage position in which the strut lies substantially in a plane parallel to, and superposed on, the plane of the rear frame assembly;
   E) a U shaped diagonal strut having an intermediate portion and two legs with ends that are pivotally attached to the forward frame portion at the hinge means for swinging movement between a use position in which the intermediate portion is removably attached to the intermediate portion of the diagonal strut of the vertical strut and a storage position in which the diagonal strut lies substantially in a plane parallel to the plane of the forward frame portion;
   F) a U shaped handle assembly having legs terminating in hinged connections to the legs of the diagonal strut adjacent the intermediate portion of the diagonal strut for swinging movement between a use position in which the handle assembly extends diagonally upward from the diagonal strut at substantially a common angle therewith and a storage position in which the handle assembly lies substantially in a plane parallel to, and superposed on, the diagonal strut; and
   G) locking means for removably locking the handle assembly to the diagonal strut in the use position.

2. The stroller of claim 1 further comprising a seat assembly mounted on the diagonal strut.

3. The stroller of claim 2 further comprising a canopy hingedly attached to the handle assembly for swingable movement between a use position substantially horizontal and a storage position lying substantially superposed on and parallel to the handle assembly.

4. The stroller of claim 3 in which the wheels have large surface bearing areas sufficient to support the stroller on soft sand.

5. The stroller of claim 1 in which the wheels have large surface bearing areas sufficient to support the stroller on soft sand.

6. The stroller of claim 5 further comprising a footrest attached to the lateral legs of the forward frame portion.

7. A collapsible and nestable stroller comprising:
   A) a forward frame portion including two lateral legs having forward and rear ends, the legs being spaced close together at the forward ends and supporting therebetween a forward axle and at least one wheel rotatably mounted on the forward axle, the legs being spaced farther apart at the rear ends than the front ends;
   B) a rear frame portion including two lateral legs having front and back ends, each back end supporting thereon a rear axle and at least one wheel rotatably mounted on the rear axle;
   C) hinge means for hingedly connecting each front end to one of the rear ends for swinging movement between a use position in which the lateral legs of the forward and rear frame portions lie substantially in a common horizontal plane and a storage position in which the legs of the forward and rear frame portions lie in substantially parallel planes superposed on one another, the hinge means limiting the motion of the legs beyond the common plane in the use position;
   D) a U shaped vertical strut having an intermediate portion and two legs with ends that are pivotally attached to the back ends of the rear frame assembly for swinging movement between a use position in which the strut extends substantially vertical and a storage position in which the strut lies substantially in a plane parallel to, and superposed on, the plane of the rear frame assembly;
   E) a U shaped diagonal strut having an intermediate portion and two legs with ends that are pivotally attached to the forward frame portion at the hinge means for swinging movement between a use position in which the intermediate portion of the diagonal strut is removably attached to the intermediate portion of the vertical strut and a storage position in which the diagonal strut lies substantially in a plane parallel to the plane of the forward frame portion;

F) a U shaped handle assembly having legs terminating in hinged connections to the legs of the diagonal strut adjacent the intermediate portion of the diagonal strut for swinging movement between a use position in which the handle assembly extends diagonally upward from the diagonal strut at substantially a common angle therewith and a storage position in which the handle assembly lies substantially in a plane parallel to, and superposed on, the diagonal strut;

G) locking means for removably locking the handle assembly to the diagonal strut in the use position;

H) a seat assembly mounted on the diagonal strut;

I) a canopy hingedly attached to the handle assembly for swingable movement between a use position substantially horizontal and a storage position lying substantially superposed on and parallel to the handle assembly;

J) a footrest attached to the upper legs of the forward frame position; and

K) the wheels having large surface bearing areas sufficient to support the stroller on soft sand.

8. A collapsible and nestable stroller comprising:

A) a forward frame portion including two lateral legs having forward and rear ends, the legs being spaced close together at the forward ends and supporting therebetween a forward axle and at least one wheel rotatably mounted on the forward axle, the legs being spaced farther apart at the rear ends than the front ends;

B) a rear frame portion including two lateral legs having front and back ends, each back end supporting thereon a rear axle and at least one wheel rotatably mounted on the rear axle;

C) hinge means for hingedly connecting each front end to one of the rear ends for swinging movement between a use position in which the lateral legs of the forward and rear frame portions lie substantially in a common horizontal plane and a storage position in which the legs of the forward and rear frame portions lie in substantially parallel planes superposed on one another, the hinge means limiting the motion of the legs beyond the common plane in the use position;

D) a U shaped vertical strut having an intermediate portion and two legs with ends that are pivotally attached to the back ends of the rear frame assembly for swinging movement between a use position in which the strut extends substantially vertical and a storage position in which the strut lies substantially in a plane parallel to, and superposed on, the plane of the rear frame assembly;

E) a U shaped diagonal strut having an intermediate portion and two legs with ends that are pivotally attached to the forward frame portion at the hinge means for swinging movement between a use position in which the intermediate portion of the diagonal strut is removably attached by means for removable attachment to the intermediate portion of the vertical strut and a storage position in which the diagonal strut lies substantially in a plane parallel to the plane of the forward frame portion;

F) a U shaped handle assembly having legs terminating in hinged connections to the legs of the diagonal strut adjacent the intermediate portion of the diagonal strut for swinging movement between a use position in which the handle assembly extends diagonally upward from the diagonal strut at substantially a common angle therewith and a storage position in which the handle assembly lies substantially in a plane parallel to, and superposed on, the diagonal strut; and G) locking means for removably locking the handle assembly to the diagonal strut in the use position.

* * * * *